(12) United States Patent
Tsuruta

(10) Patent No.: US 6,204,622 B1
(45) Date of Patent: Mar. 20, 2001

(54) POSITION CONTROLLER

(75) Inventor: Kazuhiro Tsuruta, Kitakyushu (JP)

(73) Assignee: Kabushiki Kaisha Yaskawa Denki, Kitakyushu (JP)

( * ) Notice: Subject to any disclaimer, the term of this patent is extended or adjusted under 35 U.S.C. 154(b) by 0 days.

(21) Appl. No.: 09/380,757

(22) PCT Filed: Sep. 5, 1997

(86) PCT No.: PCT/JP97/03147

§ 371 Date: Sep. 13, 1999

§ 102(e) Date: Sep. 13, 1999

(87) PCT Pub. No.: WO98/40801

PCT Pub. Date: Sep. 17, 1998

(30) Foreign Application Priority Data

Mar. 12, 1997 (JP) .................................... 9-078924

(51) Int. Cl.[7] .................................... G05B 11/36
(52) U.S. Cl. .................... 318/609; 318/560; 318/632; 318/561; 318/618; 318/610; 318/116
(58) Field of Search .................... 318/560, 632, 318/561, 618, 610, 609, 116

(56) References Cited

U.S. PATENT DOCUMENTS 5,952,804 * 9/1999 Hamamura et al. .................. 318/560

* cited by examiner

Primary Examiner—Karen Masih
(74) Attorney, Agent, or Firm—Armstrong, Westerman, Hattori McLeland & Naughton, LLP

(57) ABSTRACT

A position controller has a command generator for generating position instructions, a position control unit for controlling a position by inputting a position instruction and the position of a motor being an object to be controlled, and outputting a speed instruction so that they become coincident with each other, a speed control unit for controlling a speed by inputting a speed instruction and a speed of the motor and outputting a torque instruction so that the speed instruction and speed become coincident with each other. A current control unit is provided for controlling a current on the basis of the torque instruction, wherein the speed control unit is provided with a speed feedback filter which obtains a new speed of a motor by filtering the speed through a low-pass filter, a subtracter which obtains a speed deviation by subtracting the new speed from the speed instruction, an integrator which obtains an integral figure of the speed deviation by time-integrating the speed deviation by a time constant Ti, and a multiplier which multiplies the speed instruction by $\alpha(0.0 \leq \alpha \leq 1.0)$. An adder and subtracter adds a signal of the multiplier to the integrated figure of the speed deviation and subtracts the speed therefrom, a multiplier calculates a torque instruction by multiplying the output of the adder and subtracter by a speed loop gain kv, and a torque filter makes a torque instruction into a new torque instruction by filtering it through a low-pass filter.

3 Claims, 3 Drawing Sheets

POSITION CONTROLLER

TECHNICAL FIELD

The present invention relates to a position controller for motors, robots, machine tools, etc., and in particular to a position controller for which a high speed response is required.

BACKGROUND ART

As a position controller aiming at a high speed response, for example, a position controller is available, which is provided with a command generator for generating position instructions, a position control unit for controlling a position by inputting a position instruction and the position of a motor being an object to be controlled, and outputting a speed instruction so that they become coincident with each other, a speed control unit to control a speed by inputting a speed instruction and a speed of the motor, and outputting a torque instruction so that they become coincident with each other, and a current control unit for controlling a current on the basis of the inputted torque instruction, and further provided with a subtracter which obtains a speed deviation by subtracting the speed from the speed instruction, an integrator which obtains an integral figure of the speed deviation by time-integrating the speed deviation with a time constant Ti, a multiplier for multiplying the speed instruction by $\alpha(0.0 \leq \alpha 1.0)$, an adder and subtracter which adds a signal of the multiplier to an integral figure of the speed deviation and at the same time subtracts the speed therefrom, a multiplier for multiplying an output of the adder and subtracter by a speed loop gain, and a torque filter for filtering a signal of the multiplier through a low-pass filter and making it into a new torque instruction.

However, there is such a problem by which in cases where the speed loop gain is increased or where the time constant is shortened, the control system itself may be likely to vibrate by delay of the torque filter consisting of a low-pass filter secured to suppress vibrations induced by the mechanical system.

DISCLOSURE OF INVENTION

It is therefore an object of the invention to provide a position controller to solve the problem. A position controller according to the first claim of the invention has a command generator for generating position instructions, a position control unit for controlling a position by inputting a position instruction and the position of a motor being an object to be controlled, and outputting a speed instruction so that they become coincident with each other, a speed control unit for controlling a speed by inputting a speed instruction and a speed of the motor and outputting a torque instruction so that the speed instruction and speed become coincident with each other, and a current control unit for controlling a current on the basis of the torque instruction, wherein the speed control unit is provided with a speed feedback filter which obtains a new speed of a motor by filtering the speed through a low-pass filter, a subtracter which obtains a speed deviation by subtracting the new speed from the speed instruction, an integrator which obtains an integral figure of the speed deviation by time-integrating the speed deviation by a time constant Ti, a multiplier which multiplies the speed instruction by $\alpha(0.0 \leq \alpha 1.0)$, an adder and subtracter which adds a signal of the multiplier to the integrated figure of the speed deviation and subtracts the speed therefrom, a multiplier which calculates a torque instruction by multiplying the output of the adder and subtracter by a speed loop gain kv, and a torque filter which makes a torque instruction into a new torque instruction by filtering it through a low-pass filter.

A position controller according to the second claim of the invention is featured in that the position control unit is provided with a speed feed forward device which multiplies the position instruction by a speed feed forward constant FF ($0.0 \leq FF \leq 1.0$) after differentiating the position instruction by time, and an adder which obtains a new speed instruction by adding a signal of the speed feed forward device to the speed instruction.

A position controller according to the third claim of the invention is featured in that the speed control unit is provided with a torque feed forward device which differentiates the speed instruction by time and makes it (motor inertia+ load inertia)–fold, and multiplies it by the torque feed forward constant FFa ($0 \leq FF \leq 1$), and an adder which obtains a new torque instruction by adding a signal of the torque feed forward device to the signal of the multiplier.

BEST MODE FOR CARRYING OUT THE INVENTION

Figure 1:
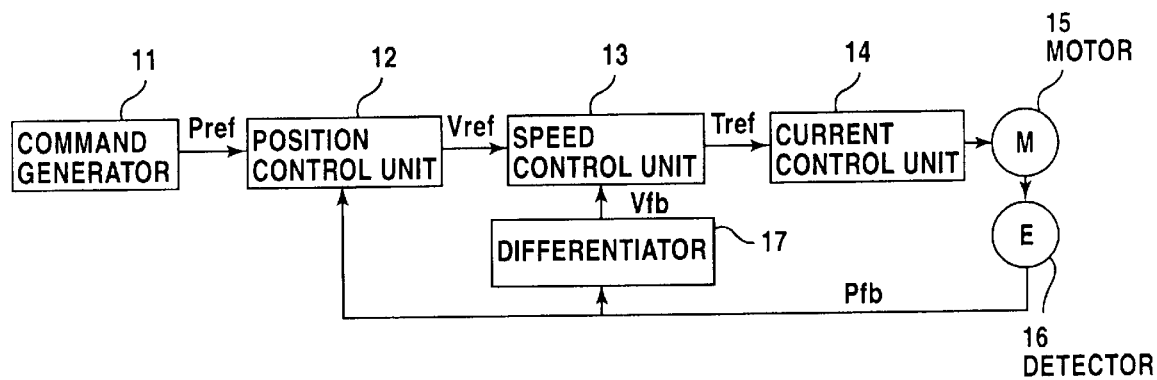
FIG. 1 is a block diagram of a motor control system to which the present invention is applied.

FIG. 1 is a block diagram of a motor controlling system to which the present invention is applied. A command generator 11 outputs a position instruction Pref. The position control unit 12 carries out position control by inputting the position instruction Pref and a position Pfb of a motor 15, which is detected by a detector 16, so that the position instruction Pref becomes coincident with the position Pfb, and outputs a speed instruction Vref. A speed control unit 13 carries out speed control by inputting the speed instruction Vref and a speed Vfb of the motor, which is obtained by a differentiator 17 taking a differential of the position Pfb, so that the speed instruction Vref and speed Vfb become coincident with each other, and outputs a torque instruction. A current control unit 14 outputs a current in response to a torque instruction Tref by inputting the torque instruction Tref and drives the motor 15.

And, the speed of the motor 15 is controlled by a speed control loop consisting of the speed control unit 13, current control unit 14, motor 15, detector 16 and differentiator 17, so that the motor 15 rotates at a speed rate responsive to a speed instruction Vref of the position control unit 12. Further, by a position control loop in which a position control unit 12 is added to the speed control loop, the position of the motor 15 is controlled so that the rotation position of the motor 15 becomes responsive to a position instruction Pref of the command generator 11.

Figure 2:
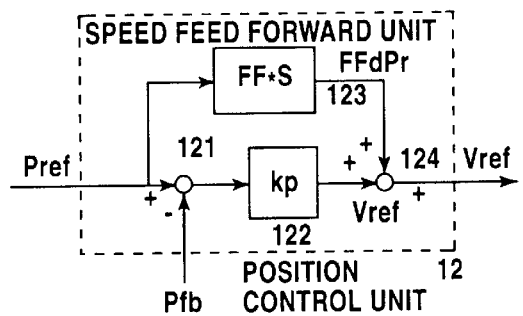
FIG. 2 is a view showing the details of a position control unit in FIG. 1.

FIG. 2 is a view showing details of the position control unit 12. The position control unit 12 consists of a subtracter 121 which obtains a position deviation Pe by inputting the position instruction Pref and motor position Pfb and subtracting the motor position Pfb from the position instruction Pref, a multiplier 122 which outputs the speed instruction Vref by making the position deviation Pe position loop gain Kp fold, a speed feed forward device 123 which obtains a speed feed forward signal FFdPr by differentiating the position instruction Pref by time and multiplying it by a speed feed forward constant FF ($0 \leq FE \leq 1.0$), and an adder 124 which adds a speed feed forward signal FFdPr to the speed instruction Vref and makes a new speed instruction Vref. Thereby, the the position control unit 12 outputs the speed instruction Vref to the speed control unit 13.

Figure 3:
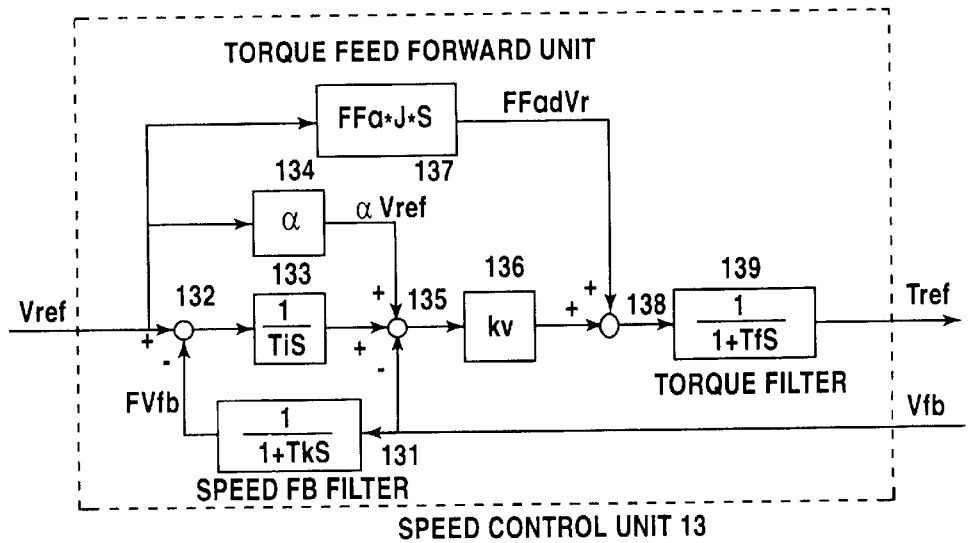
FIG. 3 is a view showing the details of a speed control unit in FIG. 1.

FIG. 3 is a view showing details of the speed control unit 13. The speed control unit 13 consists of a speed EB filter 131 which obtains a speed EVfb by inputting a speed instruction Vref and a speed Vfb, and filtering the speed Vfb through a low pass filter, a subtracter 132 which obtains a speed deviation Ve by subtracting the speed FVfb from the speed instruction Vref, an integrator 133 which obtains an integrated figure SVe of the speed deviation by time-integrating the speed deviation Ve by a time constant Ti, a multiplier 134 which obtains a proportional signal αVref by multiplying the speed instruction Vref by α($0.0 \leq \alpha \leq 1.0$), an adder/subtracter 135 which adds the proportional signal αVref to the integrated figure SVe of the speed deviation and subtracts the speed Vfb therefrom, a multiplier 136 which calculates a torque instruction Tref by multiplying an output of the adder/subtracter by a speed loop gain Kv, a torque feed forward device 137 which differentiates the speed instruction Vref by time, makes J J-fold as the sum of motor inertia and load inertia, multiplies it by the torque feed forward constant FFa ($0 \leq FFa \leq 1.0$), and outputs a torque feed forward signal FFadVr, an adder 138 which makes a new torque instruction Tref by adding the torque feed forward signal FFadVr to the torque instruction Tref, and a torque filter 139 which creates a new torque instruction Tref by filtering the torque instruction Tref through a low pass filter. Thereby, the speed control unit 13 outputs a torque instruction Tref to the current control unit 14.

Figure 4A:
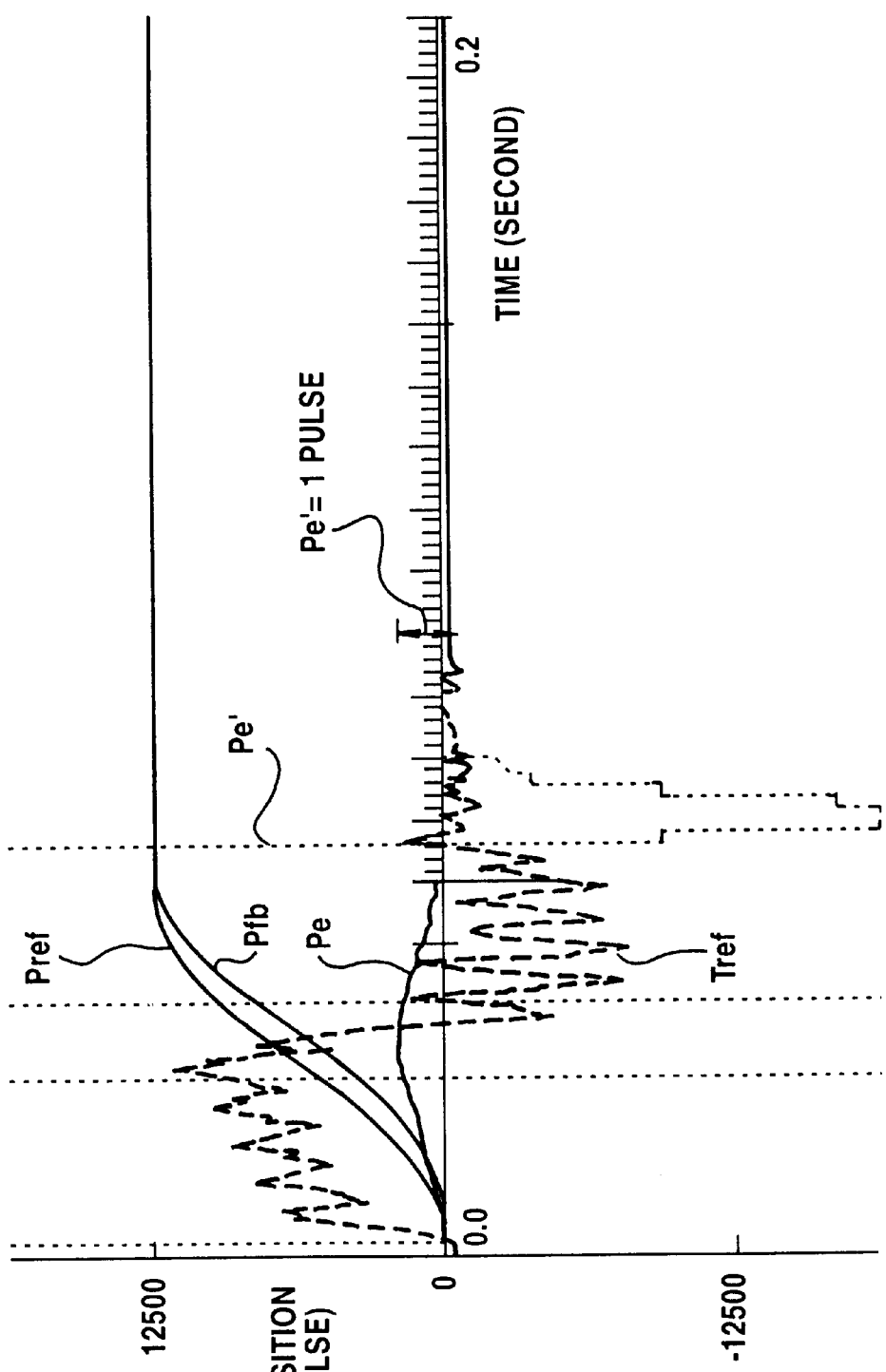
FIG. 4 are views showing examples of actions where a one-axis roller slider is driven by using the present invention.
Figure 4B:
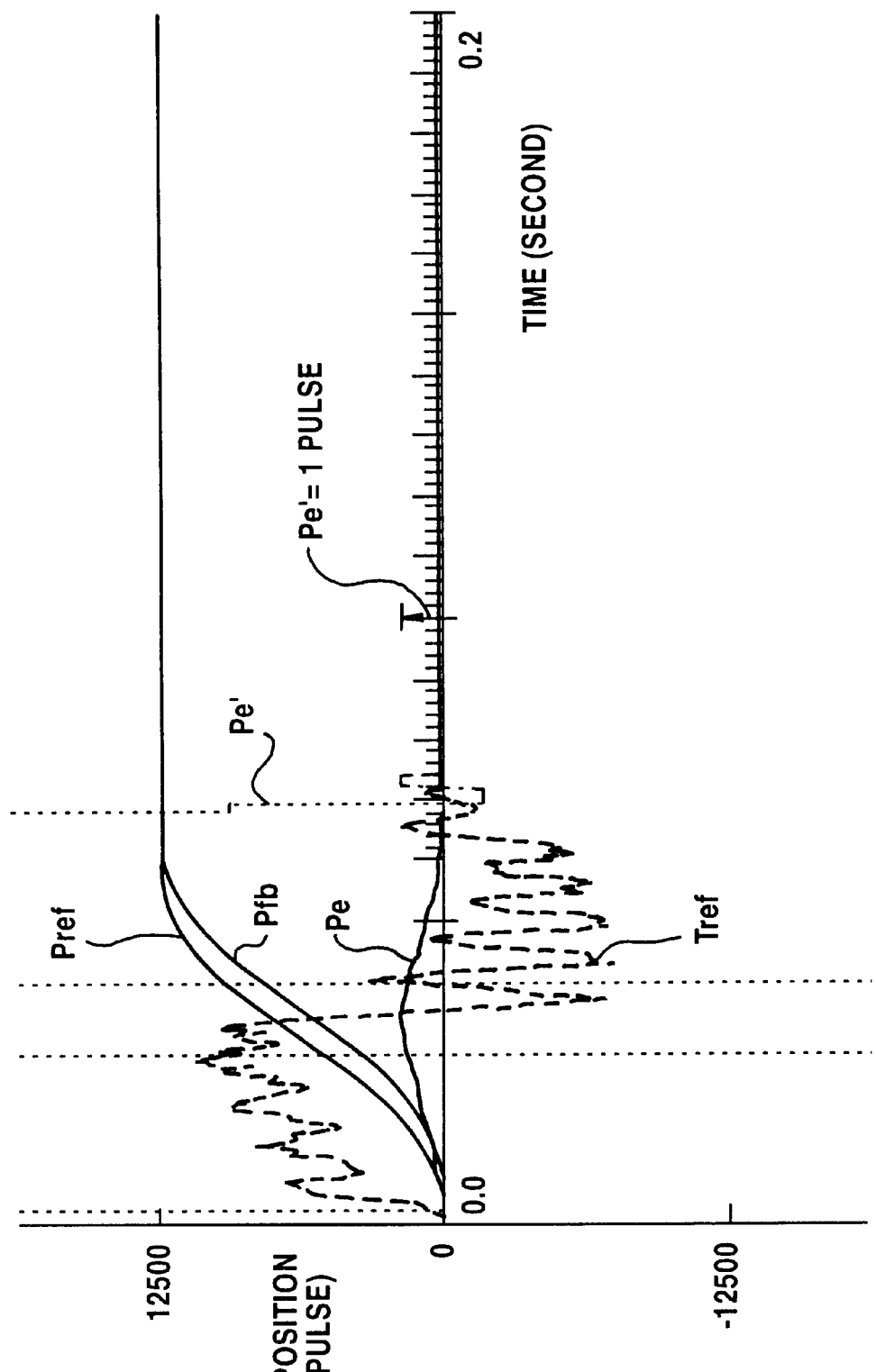

FIGS. 4 are views showing examples of actions where a one-axis roller slider is driven by using the present invention, wherein, as shown in a conventional example, (a) shows a state wherein a torque filter is employed in order to suppress vibrations, P (proportional) control is adopted for position control, and 1-P (integration proportion) control (a=0) is adopted for speed control. In addition, speed feed forward and torque feed forward are not employed (FF=FFa–0), and (b) shows a state where a response according to the present invention is employed which is such that a speed FB filter is added to the conventional example. The control parameters of the present invention are the same as those in the conventional example, wherein the position loop gain is Kp=200 rad/s, speed loop gain is Kv=200 Hz, time constant of speed loop integration is Ti=1.56 ms, and torque filter is Tf=0.4 ms. However, the preferred embodiment of the invention is provided with a speed FB filter, and the time constant becomes Tk=0.4 ms. As has been made clear from the drawings, overshoot arises when positioning in the conventional example. Kv may be increased or Ti may be shortened in order to eliminate the overshoot. However, Kv and/or Ti cannot be adjusted anymore because vibrations occur. In addition, although the overshoot can be eliminated by lowering Kp, the positioning time may be lengthened. On the other hand, in the preferred embodiment of the invention, a high speed positioning can be achieved without making any overshoot. Further, in the drawing, Pref indicates a position instruction, Pfb indicates a motor position, Pe indicates a position deviation, Pe' indicates enlargement of Pe, and Tref indicates a torque instruction.

INDUSTRIAL APPLICABILITY

As described above, according to the invention, since the speed control unit is provided with a speed FB filter, the control system itself does not vibrate even though the speed loop gain is increased or the time constant is shortened, wherein a quick reach at an objective position can be achieved. Therefore, it is possible to provide a position controller which has high performance and useful applicability.

What is claimed is:

1. A position controller for controlling a motor position, comprising:

a command generator for generating a position instruction:

a position control unit for controlling a position by inputting a position instruction and a motor position being an object to be controlled and outputting a speed instruction so that they become coincident with each other;

a speed control unit for controlling a speed by inputting a speed instruction and a speed of said motor and outputting a torque instruction so that they become coincident with each other; and a current control unit for controlling a current on the basis of the torque instruction;

wherein said speed control unit comprises;

a speed feedback filter which obtains a new speed of a motor by filtering the speed through a low-pass filter;

a subtracter which obtains a speed deviation by subtracting the new speed from the speed instruction;

an integrator which obtains an integrated figure of the speed deviation by time-integrating the speed deviation by a time constant Ti;

a multiplier for multiplying the speed instruction by a coefficient α($0.0 \leq \alpha \leq 1.0$);

an adder and subtracter which adds an integrated figure of the speed deviation to a signal of the multiplier and subtracts the speed therefrom;

a multiplier for multiplying the output of the adder/subtracter by a speed loop gain Kv and for calculating a torque instruction; and a torque filter for making a new torque instruction by filtering the torque instruction through a low-pass filter.

2. A position controller as set forth in claim 1, wherein said position control unit comprises;

a speed feed forward device for differentiating a position instruction by time and multiplying it by a speed feed forward constant FF ($0.0 \leq FF \leq 1.0$); and an adder which obtains a new speed instruction by adding a signal of the speed feed forward device to the speed instruction.

3. A position controller as set forth in claim 2, wherein said speed control unit comprises:

a torque feed forward device for differentiating the speed instruction by time, making it (motor inertia+load inertia)–fold, and multiplying it by a torque feed forward constant FFa ($0 \leq FFa \leq 1$); and an adder which obtains a new torque instruction by adding a signal of the torque feed forward device to the signal of said multiplier.

* * * * *